United States Patent
Sugiyama et al.

(10) Patent No.: US 6,970,320 B2
(45) Date of Patent: Nov. 29, 2005

(54) SERVO PATTERN RECORDING METHOD (75) Inventors: Kenichiro Sugiyama, Abiko (JP); Kei Yasuna, Chiyoda (JP); Takashi Yamaguchi, Tsuchiura (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 160 days.

(21) Appl. No.: 10/624,557

(22) Filed: Jul. 23, 2003

(65) Prior Publication Data

US 2004/0120067 A1  Jun. 24, 2004

(30) Foreign Application Priority Data

Jul. 24, 2002  (JP) .............. 2002-214668

(51) Int. Cl.⁷ ............................ G11B 5/596
(52) U.S. Cl. .................... 360/75; 360/77.04
(58) Field of Search ............. 360/75, 48, 77.02, 360/77.04, 77.07, 77.08

(56) References Cited

U.S. PATENT DOCUMENTS

| | | | |
|---|---|---|---|
| 6,624,963 B2 * | 9/2003 | Szita | 360/77.08 |
| 6,671,119 B2 * | 12/2003 | Baumann et al. | 360/77.08 |
| 6,700,731 B2 * | 3/2004 | Chew | 360/77.08 |
| 6,785,084 B2 * | 8/2004 | Szita | 360/77.04 |
| 2002/0105751 A1 * | 8/2002 | Yasuna et al. | 360/75 |
| 2002/0109933 A1 * | 8/2002 | Ashikaga et al. | 360/77.04 |
| 2002/0196576 A1 * | 12/2002 | Hirano et al. | 360/77.07 |

FOREIGN PATENT DOCUMENTS

JP  A-9-35225  2/1997

* cited by examiner

*Primary Examiner*—David Hudspeth
*Assistant Examiner*—James L Habermehl
(74) *Attorney, Agent, or Firm*—Antonelli, Terry, Stout and Kraus, LLP.

(57) ABSTRACT

A servo write method capable of generating and recording correction data, to be used for compensating for repeatable position error caused by write errors of servo patterns, in a short time is presented. In the recording of the servo pattern, correction data for correcting revolution-synchronous components are generated from a position error signal which is obtained from the difference between a target position and a magnetic head position, and the correction data are recorded in servo areas on a disk.

3 Claims, 11 Drawing Sheets

M: SECTOR MARKER/ SYNCHRONIZATION AREA
G: GRAY CODE AREA
P: POSITION SIGNAL AREA
C1: CORRECTION DATA FOR WRITING
C2: CORRECTION DATA FOR READING
D: DATA AREA

M: SECTOR MARKER/ SYNCHRONIZATION AREA
G: GRAY CODE AREA
P: POSITION SIGNAL AREA
C1: CORRECTION DATA FOR WRITING
C2: CORRECTION DATA FOR READING
D: DATA AREA

SERVO PATTERN RECORDING METHOD

BACKGROUND OF THE INVENTION

The present invention relates to a method for writing a servo signal, to be used for placing a head at proper positions on a magnetic disk, to the magnetic disk of a magnetic disk unit.

With the increase of recording density in recent years, the precision of head positioning required of magnetic disk units is increasing rapidly. In order to realize high-precision head positioning, it is essential to reduce synchronous vibration (vibration synchronous with the revolution of the disk) which impairs the positioning accuracy. The main cause of the synchronous vibration is vibration of a servo writer or vibration of the disk during servo write being recorded as variations in the servo pattern. There exists a method for compensating for the synchronous vibration as disclosed in JP-A-9-35225, in which the shape of each track (write error) is learned or measured after the servo pattern recording (servo write) and the head positioning is carried out compensating for the synchronous vibration based on the measurement.

BRIEF SUMMARY OF THE INVENTION

However, in the above synchronous vibration compensation method disclosed in JP-A-9-35225, time necessary for learning the shape of the servo pattern increases proportionally as the number of tracks of the disk increases. Therefore, considering the whole process from the servo write to the synchronous vibration compensation, both the capital investment cost and running cost are necessitated to rise considerably.

It is therefore the object of the present invention to provide a method and a device for the servo write by which data for compensating for the synchronous vibration caused by the servo pattern writing error can be generated and recorded in a short time.

In accordance with an aspect of the present invention, in a servo pattern recording method for recording a servo pattern, to be used for detecting position information of a head on a magnetic disk mounted on a magnetic disk unit, on the magnetic disk by use of the head having a write element for writing information on the magnetic disk and a read element for reading the information from the magnetic disk, the method comprises the steps of: recording a first servo pattern for detecting position information of the head; and recording a second servo pattern by detecting the position information of the head based on the recorded first servo pattern and by positioning the head to a target position based on the detected position information. Position information of the head detected in the second servo pattern recording step is recorded on the magnetic disk.

Preferably, the second servo pattern and the position information of the head detected in the second servo pattern recording step are recorded in a plurality of areas which are arranged in a circumferential direction of the magnetic disk so as to be separated by data areas.

In a preferred aspect of the present invention, the position information of the head detected in the second servo pattern recording step is recorded on the magnetic disk during the second servo pattern recording step.

In another preferred aspect of the present invention, the position information of the head detected for a loop of track in the second servo pattern recording step is stored in memory, and the position information stored in the memory is recorded on the magnetic disk after the second servo pattern recording for the loop of track is finished.

BRIEF DESCRIPTION OF THE SEVERAL VIEWS OF THE DRAWING

The objects and features of the present invention will become more apparent from the consideration of the following detailed description taken in conjunction with the accompanying drawings, in which.

DETAILED DESCRIPTION OF THE INVENTION

Referring now to the drawings, a description will be given in detail of a preferred embodiment of a servo write method (servo pattern recording method) in accordance with the present invention.

In this embodiment, after the installation and sealing of a head, magnetic disk (hereafter, simply referred to as "disk"), etc. in the housing of the magnetic disk unit, a pattern is recorded on the disk by use of the head and an actuator of the magnetic disk unit itself without using an external measuring system and thereafter a new pattern is recorded offsetting the head based on a signal obtained by reading the previously recorded pattern. The above pattern recording process is repeated and thereby the servo pattern is formed on the whole surface of the disk.

Figure 1:
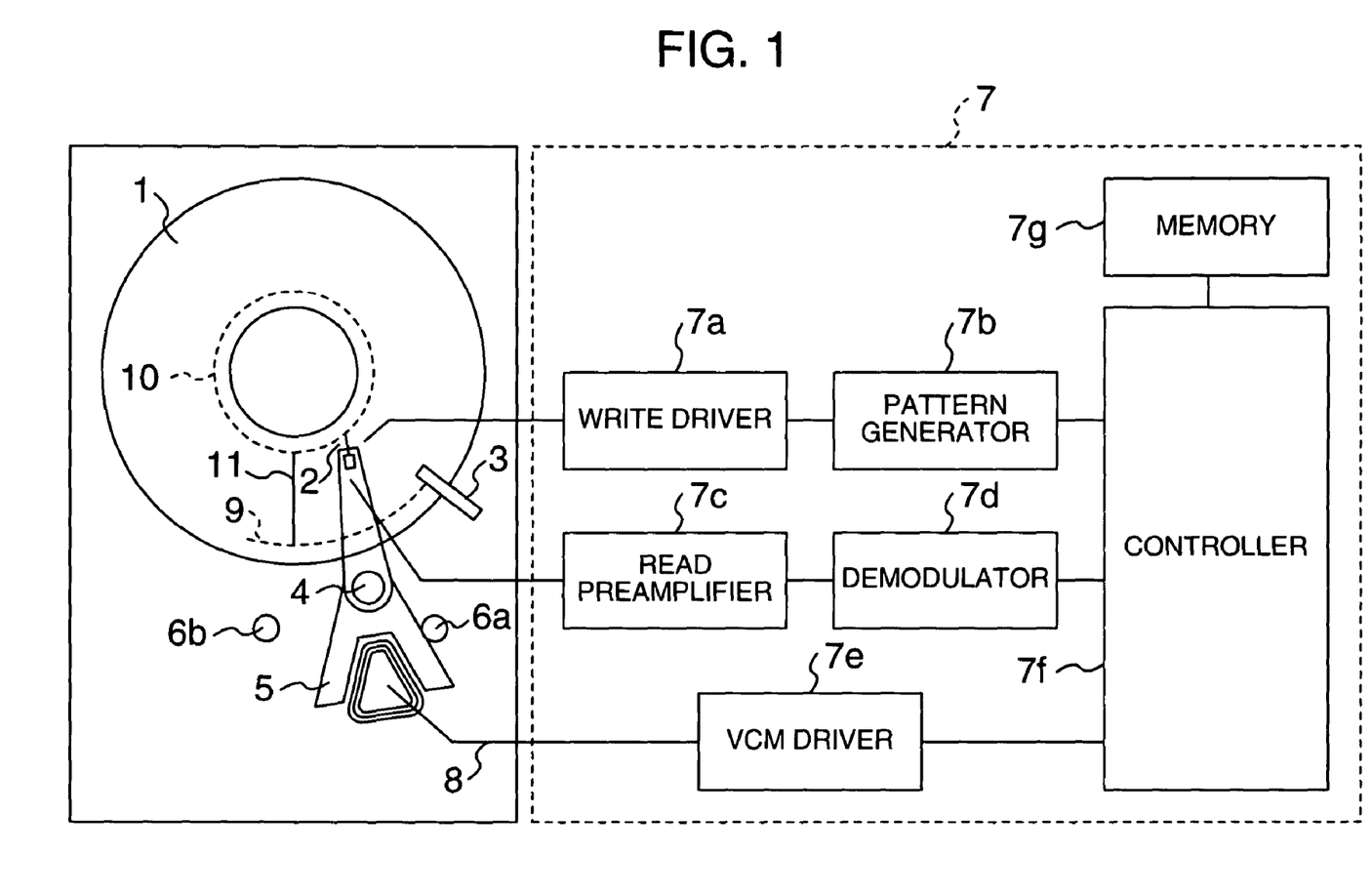
FIG. 1 is a schematic diagram showing the composition of a magnetic disk unit and signal flow during the servo write in accordance with an embodiment of the present invention.

FIG. 1 is a schematic diagram showing the composition of a magnetic disk unit and signal flow during the servo write in accordance with the embodiment of the present invention. The magnetic disk unit of FIG. 1 includes a disk 1 for storing information and a head 2 for reading/writing information from/to the disk 1. The head 2 is supported so as to be rotatable around a pivot 4 and is moved by an actuator 5 to desired radial positions on the disk 1. A ramp part 3 serves as a part where the head 2 is held when retracted from the disk 1.

When a servo pattern, to be used for acquiring position information of the head 2, is recorded on the disk 1 of the magnetic disk unit, an operation control circuit 7 is attached to the magnetic disk unit and the operation of the head 2, actuator 5, etc. is controlled by the operation control circuit 7. The operation for recording the servo pattern is called "servo write". The operation control circuit 7 for the servo write does not necessarily have to be the same as a control circuit for operating the magnetic disk unit as a product.

The operation control circuit 7 includes a pattern generator 7b, a write driver 7a for writing the servo pattern, a preamplifier 7c for amplifying a playback signal, a demodulator 7d, a VCM driver 7e for driving the actuator 5, a controller 7f for controlling the above components, and memory 7g for storing parameters necessary for the operation of the components. The pattern generator 7b outputs necessary signals to the write driver 7a according to instructions from the controller 7f. The signals include: a constant-frequency signal which is used for servo write operation (referred to as "self servo write operation") carried out using the head 2 of the magnetic disk unit; a signal which is used for recording a servo pattern (referred to as "propagation pattern") to be used for head positioning when the servo signal is recorded in the radial direction; and a signal which is used for recording a servo pattern (referred to as "product servo pattern") to be used for positioning the head to proper tracks when information is written/read to/from the disk.

Figure 2:
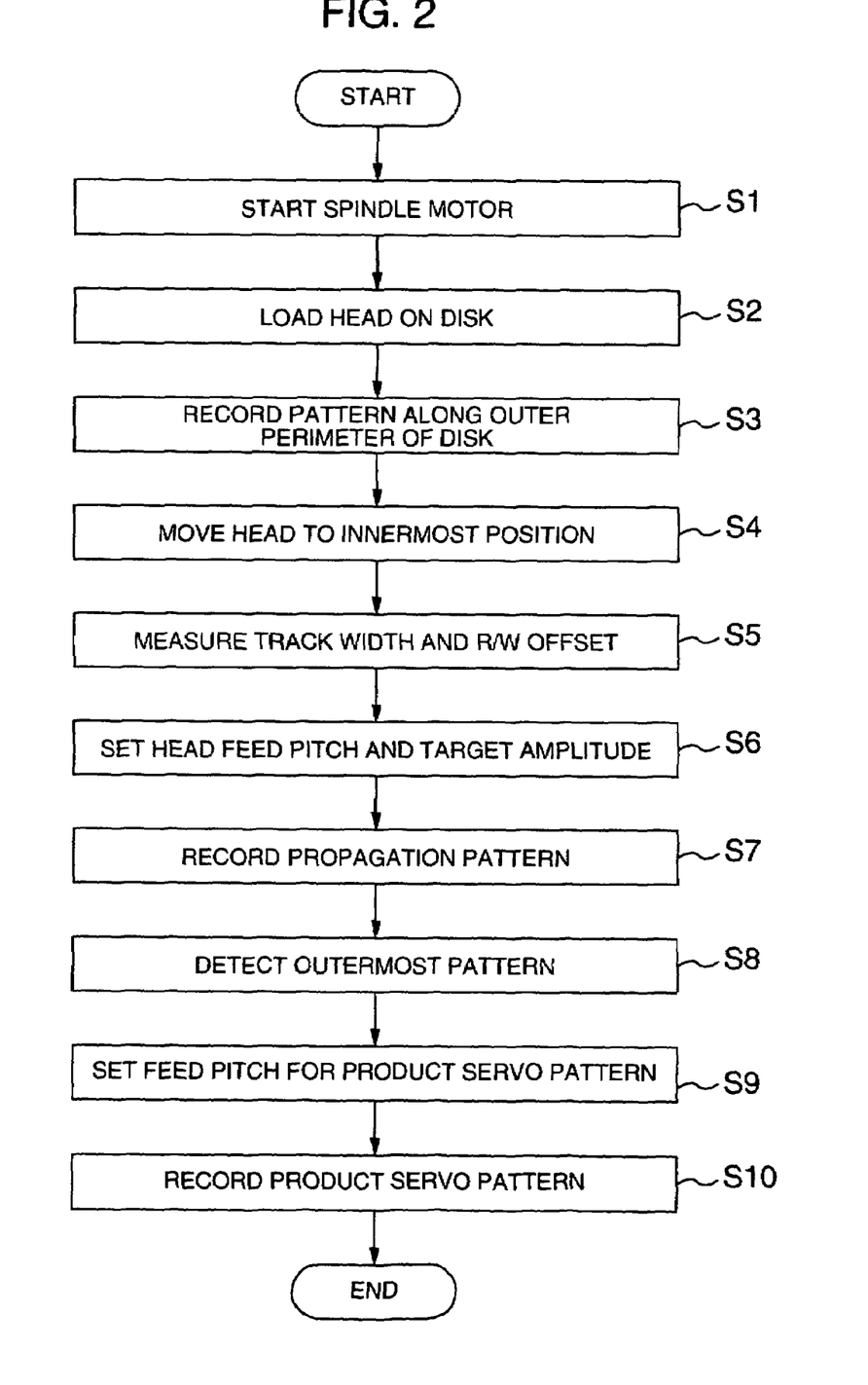
FIG. 2 is a flow chart showing a procedure for the servo write in accordance with the present invention.

In the following, the flow of the servo write operation will be explained referring to FIG. 2.

First, a spindle motor of the magnetic disk unit is started and set to a preset revolving speed (step S1). Subsequently, the head 2 is moved from the ramp part 3 onto the disk 1 (loading) by letting the VCM driver 7e drive the actuator 5 (step S2). During the loading, a write current with a constant frequency is passed through the head 2, by which a pattern having constant flux reversal intervals (magnetization reversal intervals) is recorded on the disk 1 simultaneously with the loading. The pattern (hereafter, referred to as "record area detection pattern 9" or simply as "pattern 9") is recorded to be used for detecting a record area on the disk 1. The write current is turned off a preset time after the writing of the pattern 9, by which the pattern 9 is recorded only in the outermost part of the disk 1 (step S3).

Even though the head 2 is located on the disk 1, the pattern for head positioning has not been recorded on the disk 1 yet, and thus it is still impossible to detect the radial position of the head 2 on the disk 1 at this stage. Therefore, after the loading, the head 2 is moved to the innermost position on the disk 1 without stopping until the actuator 5 contacts an innermost stopper 6a (step S4).

After the head 2 is substantially fixed at the innermost position by supplying a constant VCM current 8 to the actuator 5 and letting the actuator 5 press the stopper 6a, a constant-frequency pattern (ALL-1 pattern) is recorded on the disk 1. Subsequently, playback amplitude of the ALL-1 pattern is measured while finely changing and adjusting the head position by changing the VCM current 8, by which the relative distance between a write element and a read element of the head (R/W offset) and the track width of the recorded track are measured and learned (step S5). The ALL-1 pattern is a pattern that is recorded for the measurement of position dependency of the playback output.

Further, a head feed pitch (moving distance of the head 2 in the radial direction) is set based on the measured track width (step S6), and the aforementioned propagation pattern is recorded (step S7).

When the propagation pattern is recorded up to the outermost position, the pattern 9 which has been written during the loading is detected by the head 2 and the recording of the propagation pattern from the innermost position is finished at this point (step S8).

At this stage, a head feed pitch to be used for writing the aforementioned product servo pattern (servo pattern for the magnetic disk unit as a product) is calculated from the relationship between a total head feed length (from the innermost radial position to the outermost radial position) and the number of tracks to which the servo pattern has to be written (step S9), and the product servo pattern is recorded toward the innermost position.

When the writing of the product servo pattern is finished for the preset number of tracks, the head 2 is retracted and the servo write operation is ended (step S10).

The servo write method of this embodiment is characterized in the step S10 for writing the product servo pattern, in which values corresponding to the write error of the servo pattern are recorded in the servo areas on the disk as reference values for compensating for the synchronous vibration. In the following, each step of FIG. 2 will be described more in detail.

Figure 3:
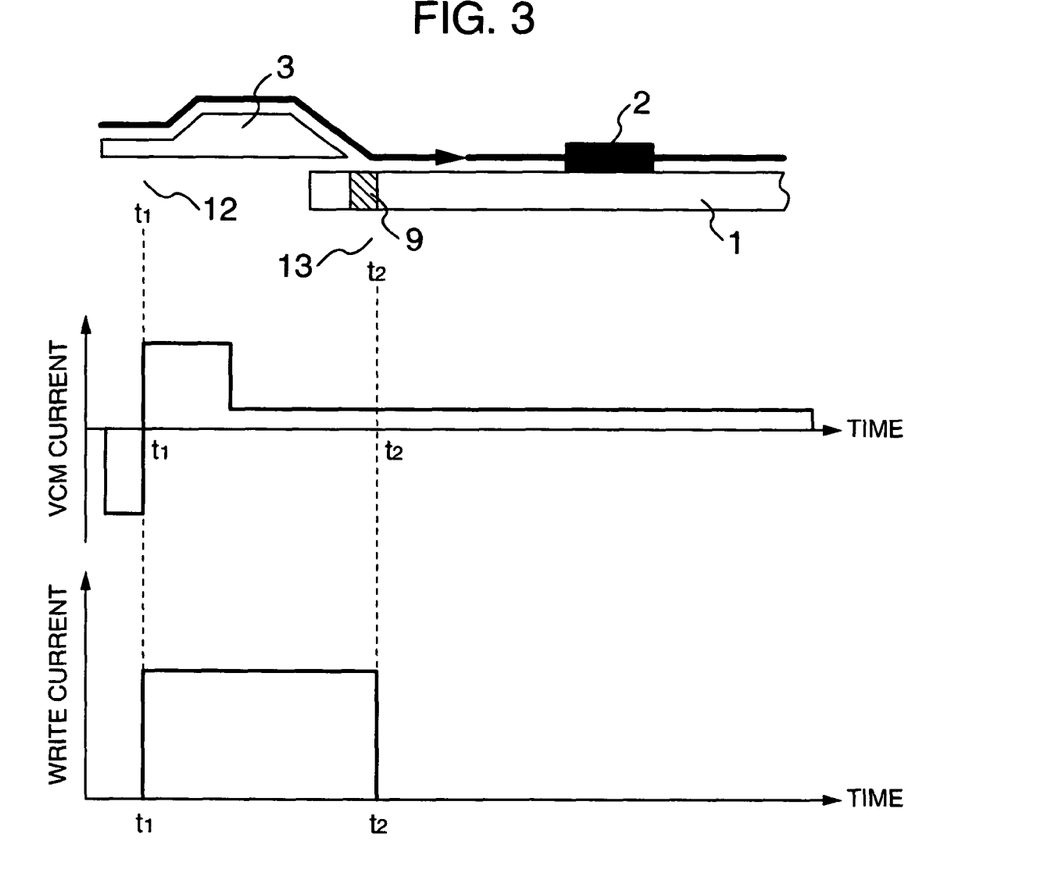
FIG. 3 is a schematic diagram showing the movement of a head of the magnetic disk unit when a record area detection pattern is written.

First, the procedure for writing the pattern signal 9 during the loading (steps S1–S3) will be explained in detail referring to FIG. 3.

In the step S1, the spindle motor is activated and its revolving speed is set to a preset speed. A DC current for moving the head 2 outward is supplied to the actuator 5 and the head 2 is moved outward until the actuator 5 is stopped by a stopper 6b, by which the head 2 is placed at an end of a standby position on the ramp part 3. Subsequently, a DC current for moving the actuator 5 inward is supplied and thereby the head 2 is loaded on the disk 1. The write current is supplied to the write element of the head 2 at the time t1 (12) when the head 2 exists on the ramp part 3. In this embodiment, t1 (12) denotes the time when the DC current is activated or when counter electromotive force from the actuator 5 is detected. Thereafter, the write current supplied to the write element is turned off at the time t2 (13) when the head 2 reached the disk 1. The write end time t2 (13) is set as below: The actuator 5 is controlled by a speed control method based on its own detection of the counter electromotive force. Therefore, the write current supplied to the write element is turned off at the time t2 (13) which corresponds to the width of the ramp part 3 and the width of a preset outermost range of the disk 1 added together. By the above procedure, the pattern 9 is written onto the outermost part of the disk 1 simultaneously with the loading operation.

Figure 4:
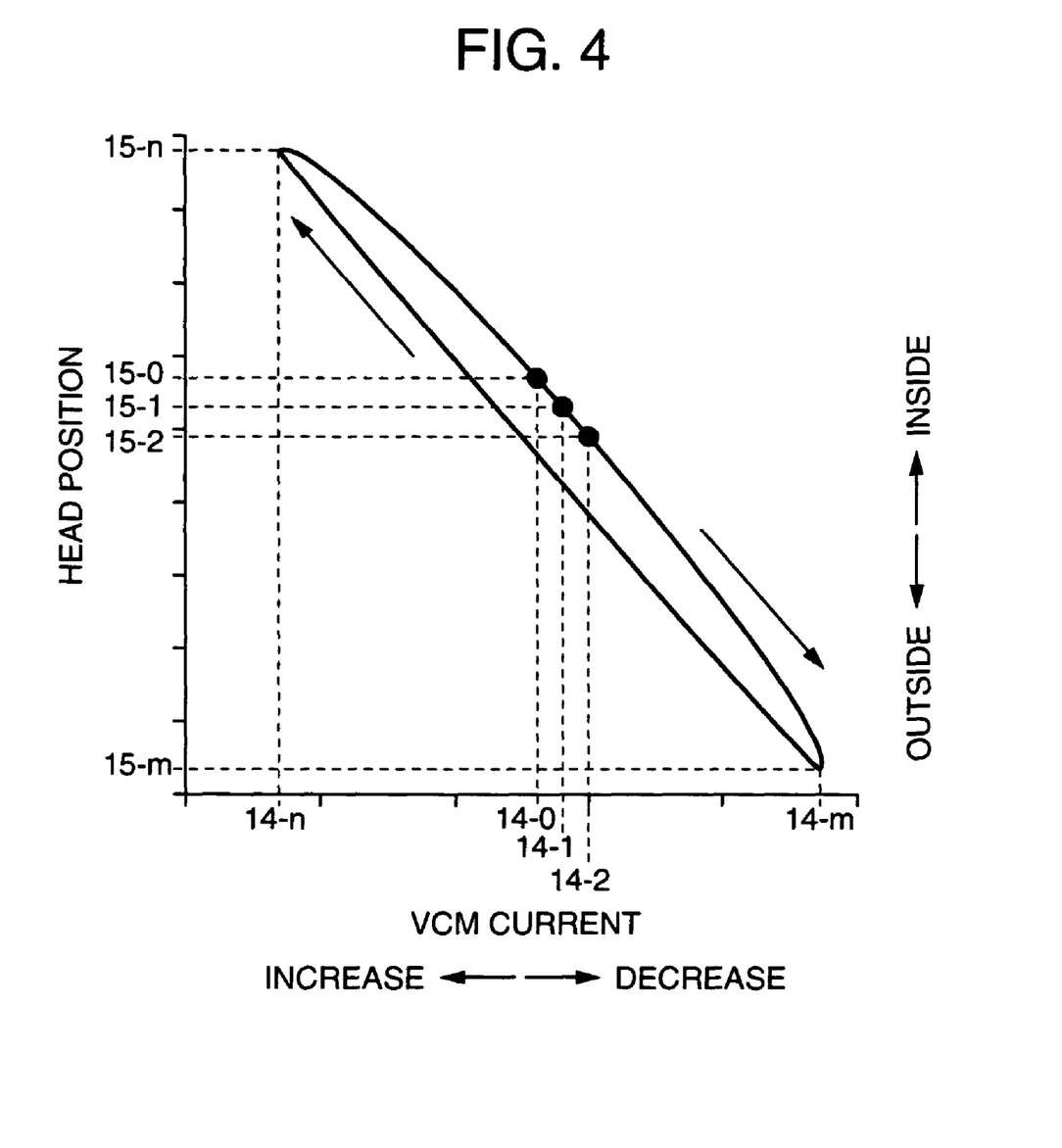
FIG. 4 is a graph showing the relationship between VCM current and radial position of the head.

After the above loading operation, the head 2 is moved inward until the actuator 5 contacts the innermost stopper 6a, and the feed pitch to be used for the propagation pattern writing is set. The procedure will be explained in detail referring to FIGS. 4 and 5. After moving the head 2 inward until the actuator 5 contacts the innermost stopper 6a in the step S4 of FIG. 2, the actuator 5 is pressed against the stopper by the constant VCM current (constant current supplied to a VCM (Voice Coil Motor)). The VCM current at this point will be expressed as "14-0" (see FIG. 4). In this state, the constant-frequency pattern (ALL-1 pattern) is written on the disk 1 for one loop. Subsequently, the VCM current for pressing actuator 5 against the stopper is reduced gradually or step by step and thereby the head is moved outward. The relationship between the VCM current and radial position of the head is shown in FIG. 4. The VCM current is gradually reduced from 14-0 (when the ALL-1 pattern was written on the disk 1) to 14-1 and 14-2, by which the head position changes outward from 15-0 to 15-1 and 15-2.

Figure 5:
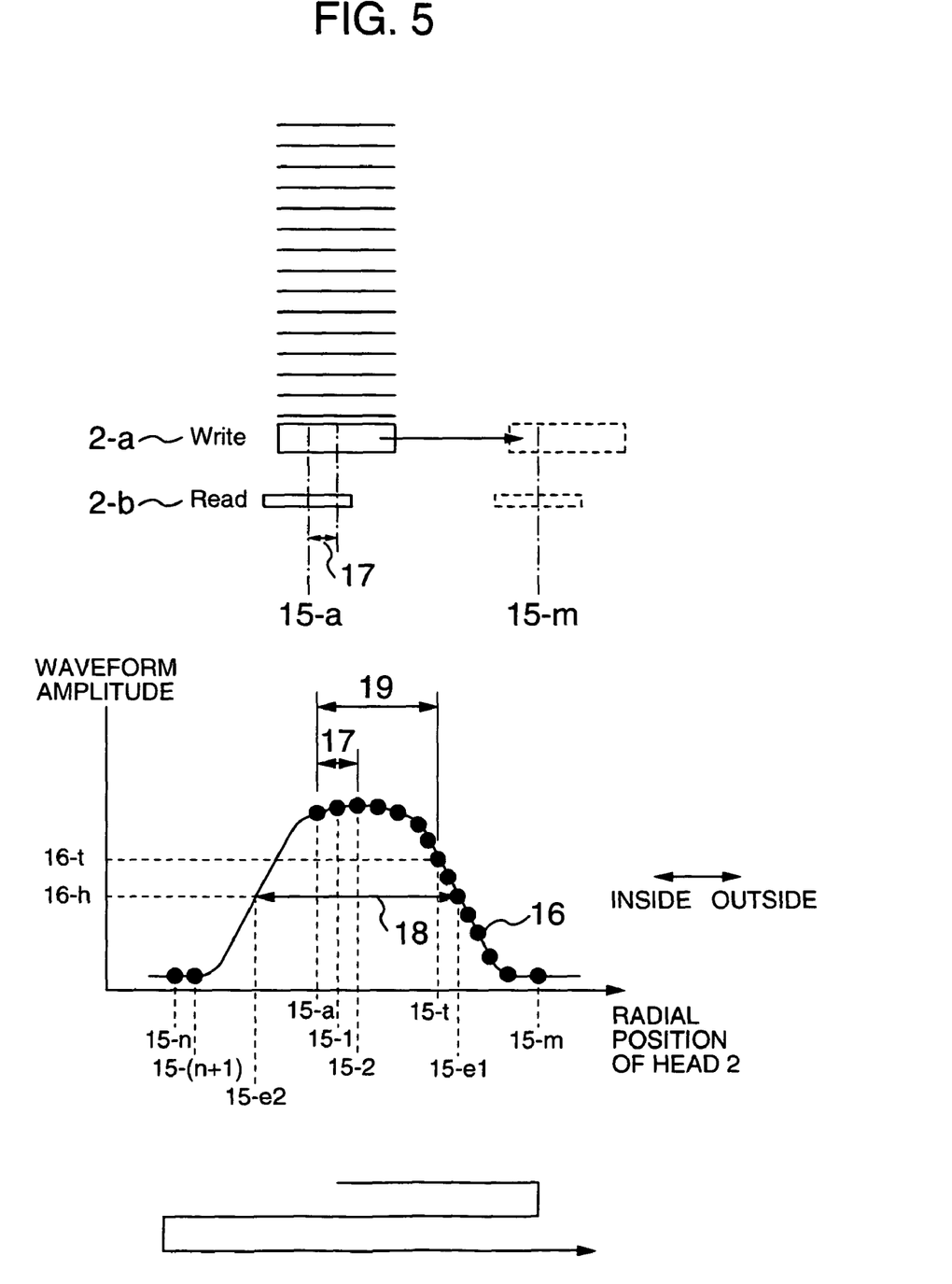
FIG. 5 is a schematic diagram showing the definition of a track width and the movement of the head when R/W offset is measured.

The relationship between the radial position of the head and the amplitude of the playback signal is shown in FIG. 5. The amplitude of the playback signal at each radial position of the moving head is converted by the demodulator 7d into a digital value, and the digital values are stored in the memory 7g by the controller 7f. After moving the head to a position 15-m by decreasing the VCM current to a preset value 14-m, the head is then moved to an inner position 15-n by increasing the VCM current to a preset value 14-n. The VCM current is reduced stepwise (from 14-n to 14-(n+1), for example) and the head is moved outward again to the position where the amplitude becomes the maximum. The amplitude at each step is converted by the pattern generator 7b into a digital value and the digital values at the steps are stored in the memory.

An off-track profile of the playback amplitude as the one shown with the reference numeral "16" in FIG. 5 is obtained by the above procedure of the steps S4 and S5. The R/W offset 17 of the head is calculated using the obtained off-track profile, from the distance between the head position 15-a when the ALL-1 pattern was written and the peak position (15-2 in this example) of the off-track profile. An effective track width is also calculated at this stage. In general, a magnetic track width can be represented by a distance in the off-track profile between two points with 50% of the maximum amplitude. Therefore, each value of the off-track profile stored in the memory is compared with the 50% value (16-h in FIG. 5) one by one. For points on the off-track profile outside the maximum amplitude point 15-2, the values stored in the memory are successively examined (compared with the 50% value) and a point 15-e1 with an amplitude first falling below 50% is regarded as an outer edge of the track. Also for points inside the maximum amplitude point 15-2, the values stored in the memory are examined similarly, by which an inner edge 15-e2 of the track is determined. The track width 18 is obtained as the distance between the two edges of the track.

Next, the head feed pitch calculation of the step S6 will be explained in detail referring to FIG. 5. In the step S7, the pattern recording is carried out by recording a new track offsetting or shifting the head 2 from an already-recorded pattern by a proper distance. The offset positioning of the head 2 is implemented by positioning the head so that the amplitude of a playback signal of the already-recorded track will be equal to a target value. The target amplitude varies depending on how wide the magnetic disk unit sets the track width of the head 2 relative to the track pitch (the ratio between the track width of the head and the track pitch). In this embodiment, the track pitch is set to 125% of the actually measured track width 18, and the head feed pitch 19 is set to 50% of the track pitch. In this case, the target amplitude for feeding the head to the recording position is set to the amplitude 16-t (shown in the off-track profile 16 of FIG. 5) at the position 15-t, which is a specific distance (head feed pitch 19 minus R/W offset 17) outside the peak position 15-2, that is, a head feed pitch 19 outside the write position 15-a.

Figure 6:
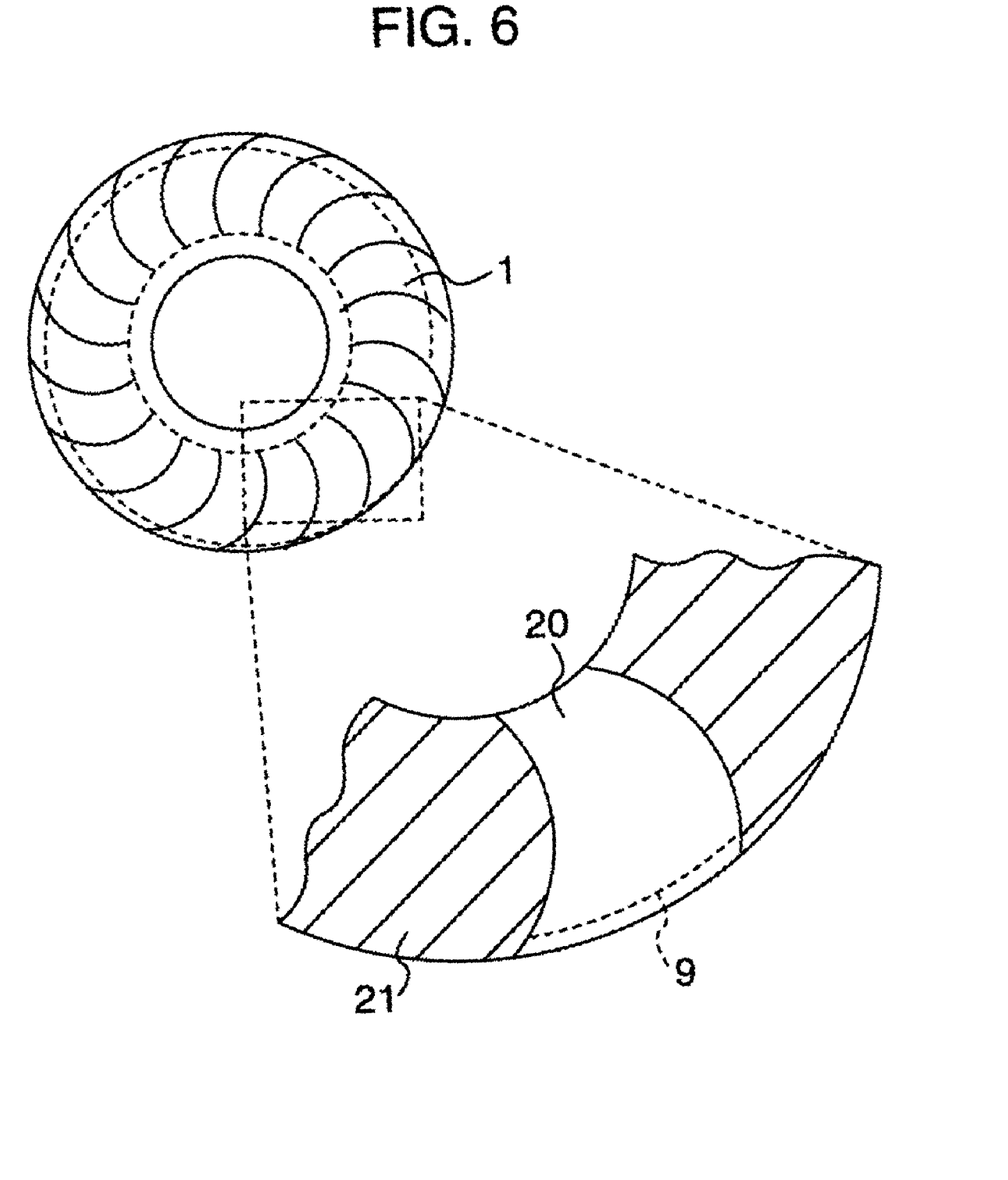
FIG. 6 is a schematic diagram showing the arrangement of a propagation pattern and a record area detection pattern written on the disk.

The propagation pattern is recorded by the procedure of the steps S5, S6 and S7 after sending the head 2 to the innermost position, and when the head 2 conducting the propagation pattern recording almost reaches the outermost position, the pattern 9 which has been written during the loading is read by the head 2. A method for recognizing the pattern 9 will be explained referring to FIG. 6. In this method, the surface of the disk 1 is partitioned into two types of areas alternately arranged in the circumferential direction: first areas 20 (in which the propagation pattern is not written) and second areas 21 (in which the propagation pattern is written). The propagation pattern recording is carried out by recognizing the two areas based on a timing signal outputted by the spindle motor. On the loading operation, the pattern 9 is written not only in the areas 21 but also in the areas 20 (in which the propagation pattern is not written). The areas 20 (having no propagation pattern) are monitored based on the timing signal from the spindle motor, and a radial position where a playback waveform is detected first is regarded as the outermost position.

When the propagation pattern recording is finished to the outermost position according to the head feed pitch 19 which has been set in the step S6, the number of feeding steps to the outermost position becomes clear. The head feed pitch 19 which is set in the step S6 varies depending on the core width of the head, and thus the step number to the outermost position changes due to variations in the head core width. Therefore, there are cases where the feed pitch has to be readjusted at the stage of the product servo pattern recording in order to place a designed number of tracks on the disk 1. The readjustment of the feed pitch for the product servo pattern is carried out by the following procedure of FIG. 7.

Figure 7:
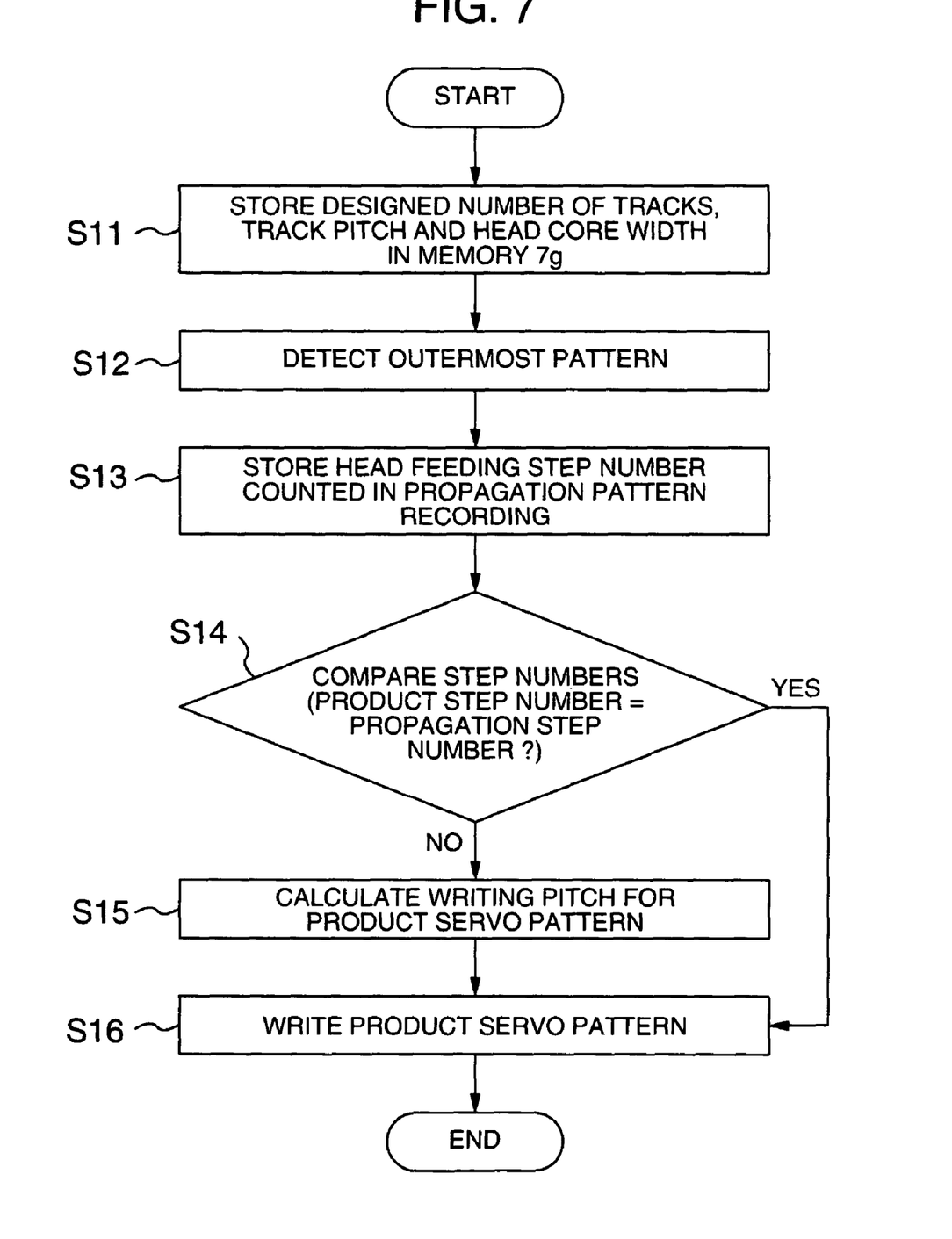
FIG. 7 is a flow chart showing a procedure for calculating a head feed pitch for the recording of a product servo pattern.

FIG. 7 is a flow chart showing the procedure for calculating the head feed pitch for the product servo pattern recording. The designed number of tracks, the track pitch and the head core width are preliminarily stored in the memory 7g (step S11). The propagation pattern recording is conducted in the radial direction and the outermost position is detected by recognizing the pattern 9 which has been written during the loading operation (step S12). The number of head feeding steps during the propagation pattern recording is counted by the controller 7f until the outermost position is detected, and the count is stored in the memory 7g (step S13). Subsequently, a suitable number of feeding steps is calculated based on the designed number of tracks, the track pitch and the head core width stored in the memory 7g, and the calculated number of feeding steps is compared with the actually counted number of feeding steps (step S14). Specifically, the suitable number of feeding steps is calculated by multiplying the number of steps necessary for recording a track by the number of tracks. If the two feeding step numbers differ from each other (NO in the step S14), the controller 7f can obtain the head feed pitch for the recording of the product servo pattern by multiplying the actually used head feed pitch by the ratio between the actually counted feeding step number and the suitable feeding step number calculated from the design value (step S15).

Figure 8:
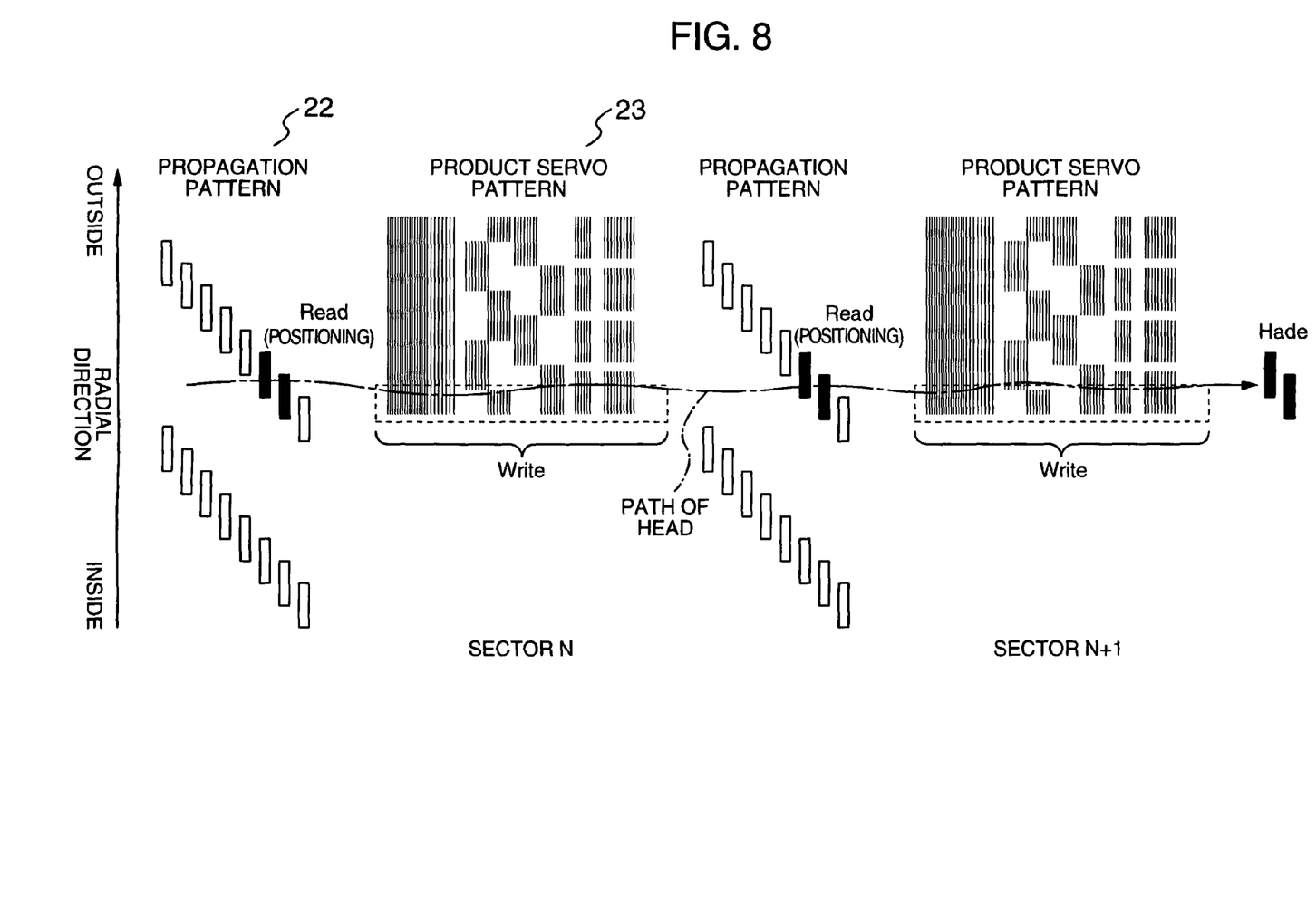
FIG. 8 is a schematic diagram showing the recording of a product servo signal.
Figure 9:
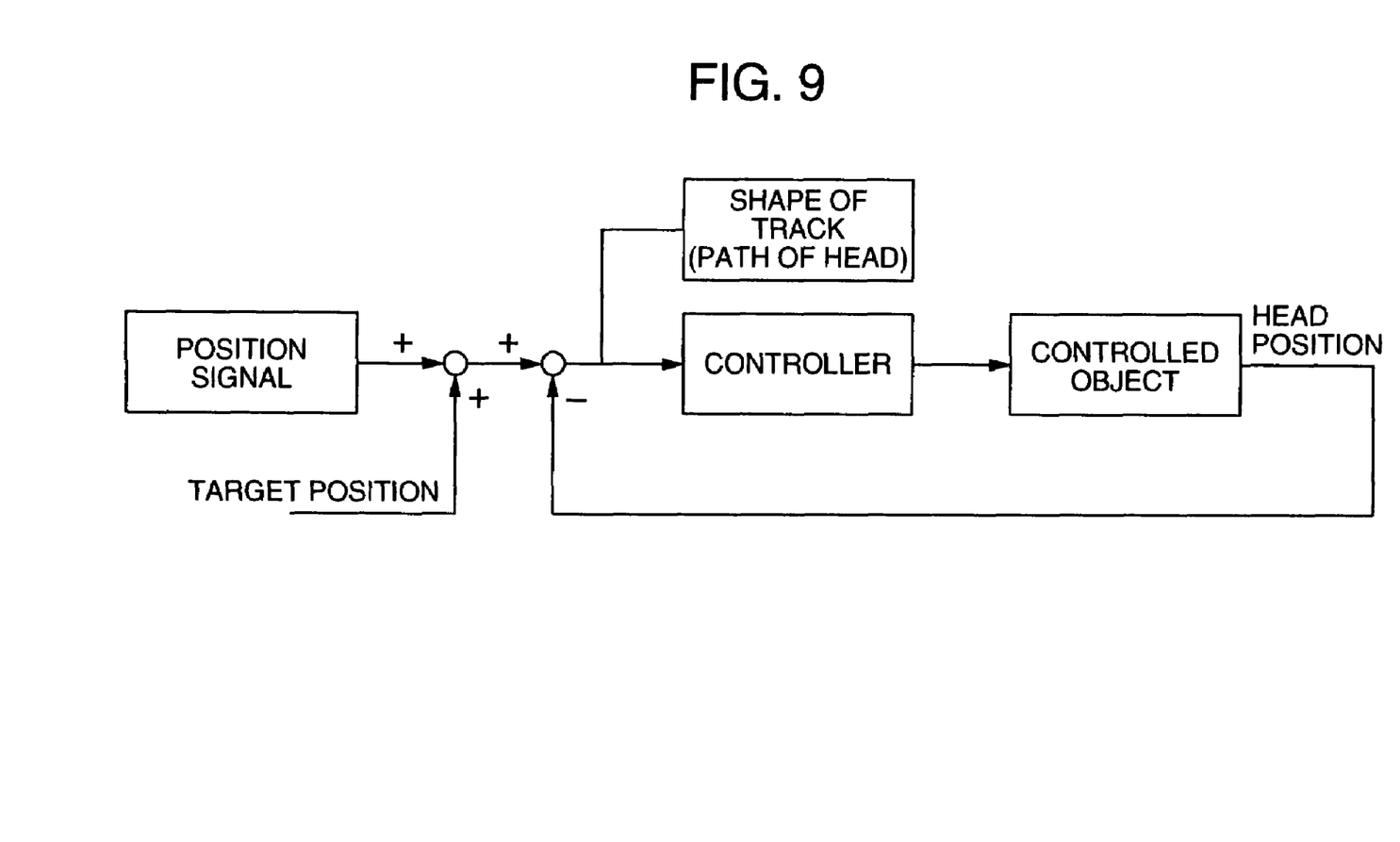
FIG. 9 is a block diagram showing a head control system employed in the embodiment.

In the recording of the product servo pattern, head positioning is carried out using the propagation pattern recorded on the whole surface of the disk as a signal for obtaining position information. An example of the arrangement of the propagation pattern and the product servo pattern on the recording of the product servo pattern is shown in FIG. 8. In FIG. 8, the product servo pattern 23 is recorded by positioning the head based on position information which is obtained by detecting the propagation pattern 22 in the inward radial direction. Following control (for positioning the head 2 on a specific track for recording the product servo pattern 23) is carried out by use of a closed-loop system of FIG. 9, including a position error signal which is obtained from the difference between a target position and the head position. The shape of a track composed of the product servo pattern corresponds to a tracking path of the head when the track was recorded. The tracking path of the head can be detected from the position error signal, and so can the track shape (write error) from the position error signal. Therefore, the controller 7f calculates the position error signal based on the difference between the position signal and the head position detected by use of the propagation pattern 22 and thereby obtains a repeatable position error compensation value (a value for compensating for the repeatable position error). The pattern generator 7b receives the repeatable position error compensation value obtained by the controller 7f and thereby generates the product servo pattern 23 that includes the repeatable position error compensation value. The product servo pattern 23 including the repeatable position error compensation value is recorded on the disk 1, that is, correction data for correcting the position error signal is recorded on the disk 1.

Figure 10:
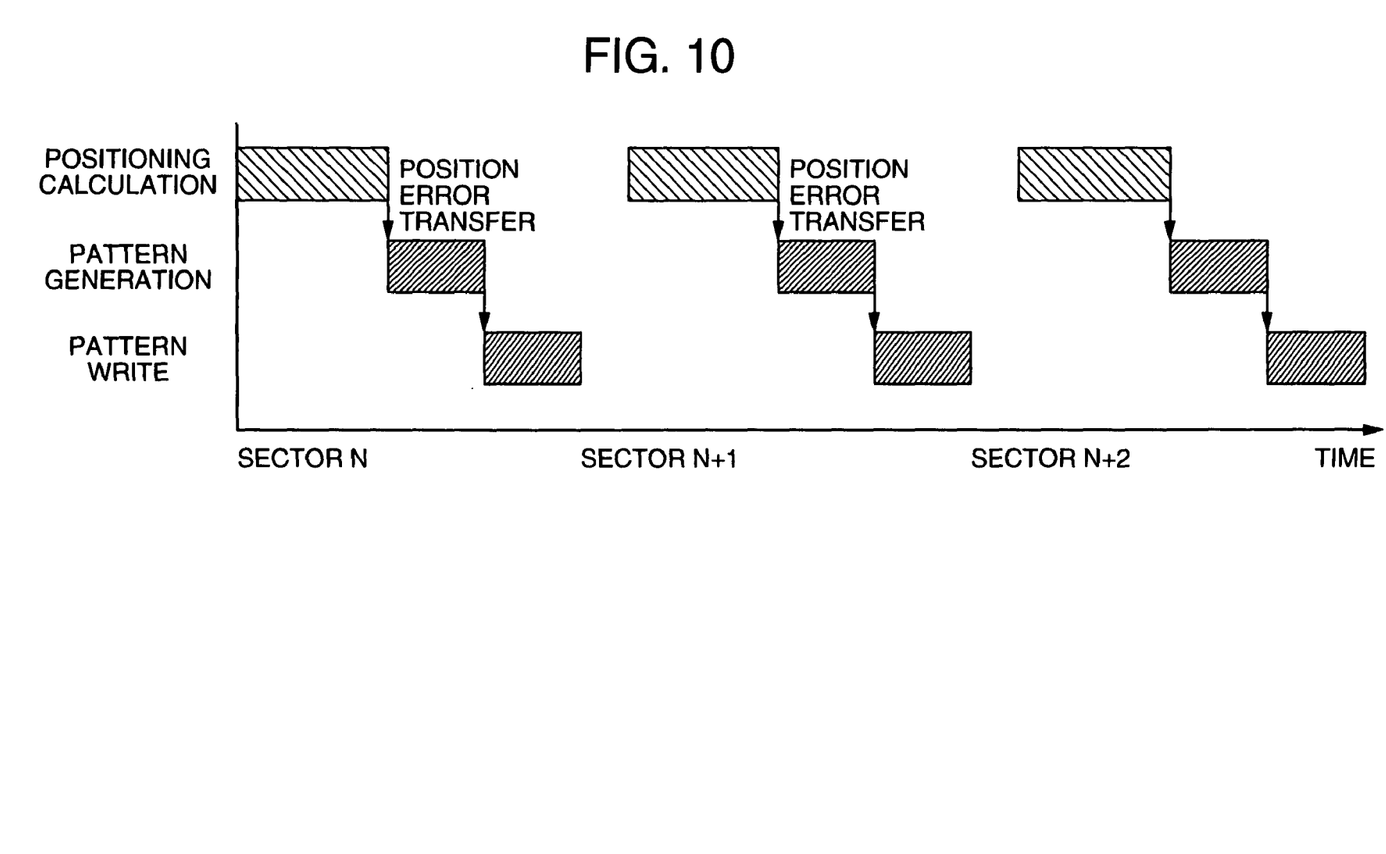
FIG. 10 is a timing chart showing timing for recording synchronous vibration compensation values.

As shown in FIG. 10, the repeatable position error compensation value for sector N is calculated from the position error signal of a stage when the product servo pattern 23 of the sector N is recorded. Preferably, the repeatable position error compensation value for the sector N is calculated based on a position error signal of a point just before or just after the recording of the product servo pattern 23 of the sector N. The calculated compensation value is recorded during a process for recording the product servo pattern 23 of the sector N. Also for the sectors N+1, N+2, etc., the product servo pattern 23 and the compensation value are recorded in a similar way. By the process, the servo pattern (to be used for detecting misalignment of the head 2) and the repeatable position error compensation value can be recorded during one revolution of the magnetic disk 1. In cases where the position error can not be formed into a pattern before the recording of the product servo pattern 23 due to insufficient performance of the controller 7f, it is possible to store the position error for one revolution in the memory 7g and then record the repeatable position error compensation value in the next revolution. In this embodiment, there is no need to learn the repeatable position error compensation value after the recording of the product servo pattern 23, and the product servo pattern 23 including the repeatable position error compensation value can be recorded in a short time.

Figure 11:
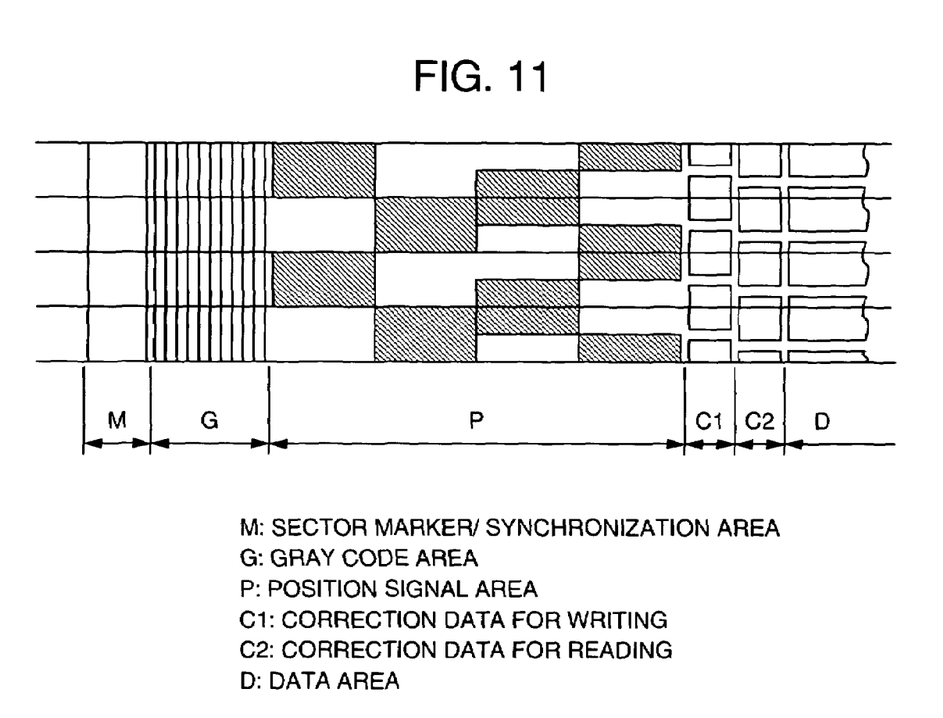
FIG. 11 is a schematic diagram showing an example of the recording of correction data on the disk.

FIG. 11 is a schematic diagram showing an example of the arrangement of the product servo pattern 23 and the repeatable position error compensation value recorded on the disk 1, in which "M" denotes a sector marker and a synchronization area and "P" denotes a position signal area. The position of the servo area is detected at the sector marker, and a reference signal for gray code G and a position signal area P is generated at the synchronization area. Coarse position of the track is detected using the gray code area G, and fine position information is obtained from the position signal area P. The track write error is defined in each sector as the deviation of the position signal area P from its ideal position. In this embodiment, the deviation in each sector is recorded as the correction data in each corresponding sector. Incidentally, the write element and the read element are separated from each other in magnetic heads of these days, therefore, the position of the head 2 in writing to a track differs from that in reading from the same track. To deal with the problem, correction data for writing and correction data for reading are recorded separately based on the R/W offset measured in the step S5. By the above method, the product servo patterns 23 for the designed number of tracks are recorded.

By the method described above, record errors of the product servo signal can be recorded on the disk during the servo write as correction values. In head positioning in a magnetic disk unit as a product, a wobble in the position signal caused by the servo pattern write error can be corrected by referring to the correction values, and the head positioning can be conducted detecting the head position along a path without a wobble. Incidentally, the above embodiment, which has been described above for clarifying the concept of the present invention, is not restricted to a specific servo pattern format nor particular hardware composition.

As set forth hereinabove, by the present invention, compensation values for compensating for the repeatable position error (caused by the write error of the servo pattern) can be detected and recorded during the servo write. Therefore, the write error of the servo pattern can be learned directly and with high precision, by which the production cost can be reduced and the tact time can be shortened considerably.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A servo pattern recording method for recording a servo pattern on a magnetic disk, to be used for detecting position information of a head on the magnetic disk mounted on a magnetic disk unit, by use of the head having a write element for writing information on the magnetic disk and a read element for reading information from the magnetic disk, comprising the steps of:
   recording a first servo pattern for detecting position information of the head; and
   recording a second servo pattern by detecting the position information of the head based on the recorded first servo pattern and by positioning the head to a target position based on the detected position information;
   wherein position information of the head detected in the second servo pattern recording step is recorded on the magnetic disk; and
   wherein the position information of the head detected in the second servo pattern recording step is recorded on the magnetic disk during the second servo pattern recording step.

2. The servo pattern recording method according to claim 1, wherein the second servo pattern and the position information of the head detected in the second servo pattern recording step are recorded on the magnetic disk in a plurality of areas which are arranged in a circumferential direction of the magnetic disk and are separated by data areas.

3. A servo pattern recording apparatus for recording a servo pattern on a magnetic disk, to be used for detecting position information of a head on the magnetic disk mounted on a magnetic disk unit, by use of the head having a write element for writing information on the magnetic disk and a read element for reading information from the magnetic disk, comprising:
   means for recording a first servo pattern for detecting position information of the head; and
   means for detecting the position information of the head based on the recorded first servo pattern and recording a second servo pattern for positioning the head to a target position based on the detected position information, position information of the head detected in the second servo pattern recording means being recorded on the magnetic disk.

* * * * *